Patented Sept. 7, 1943

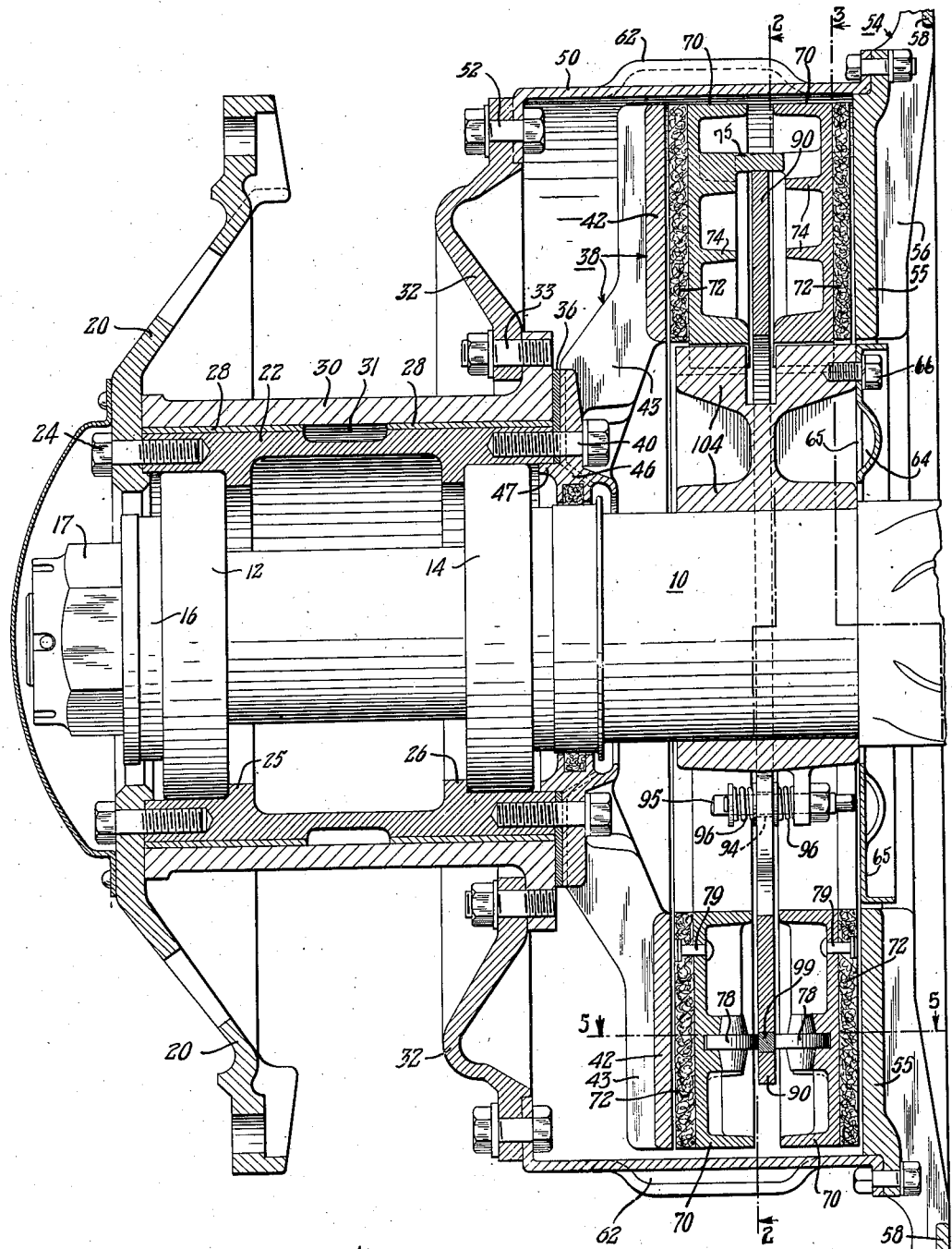

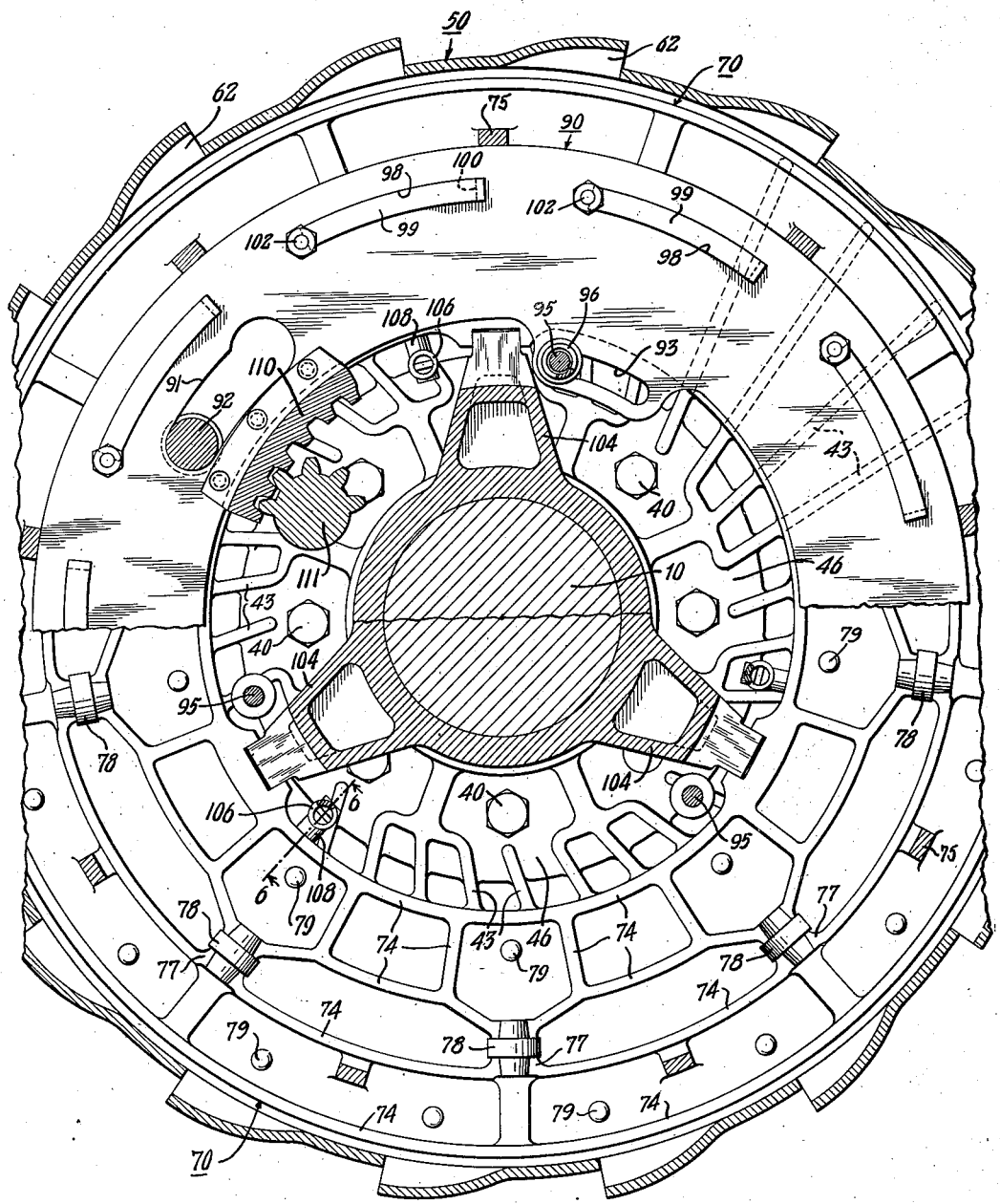

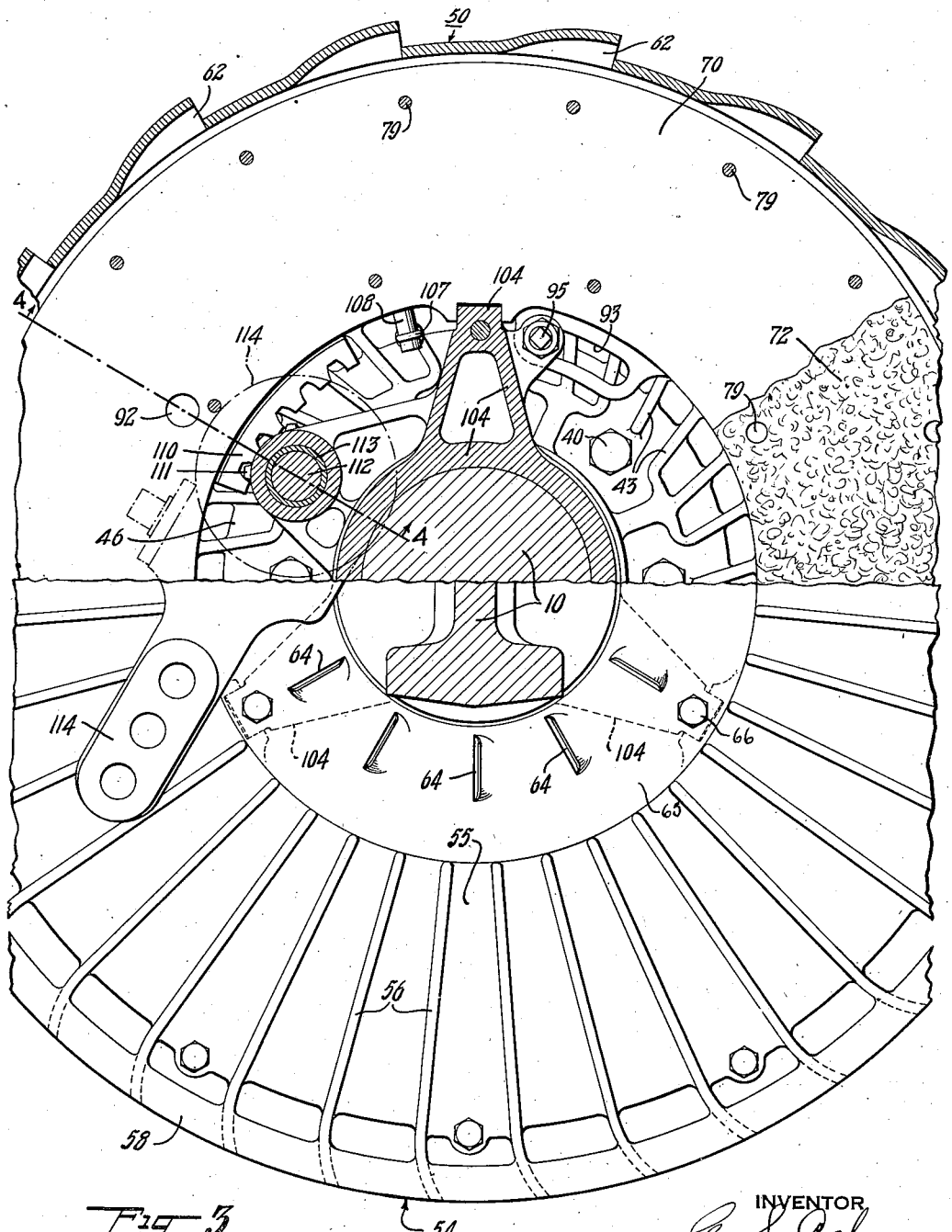

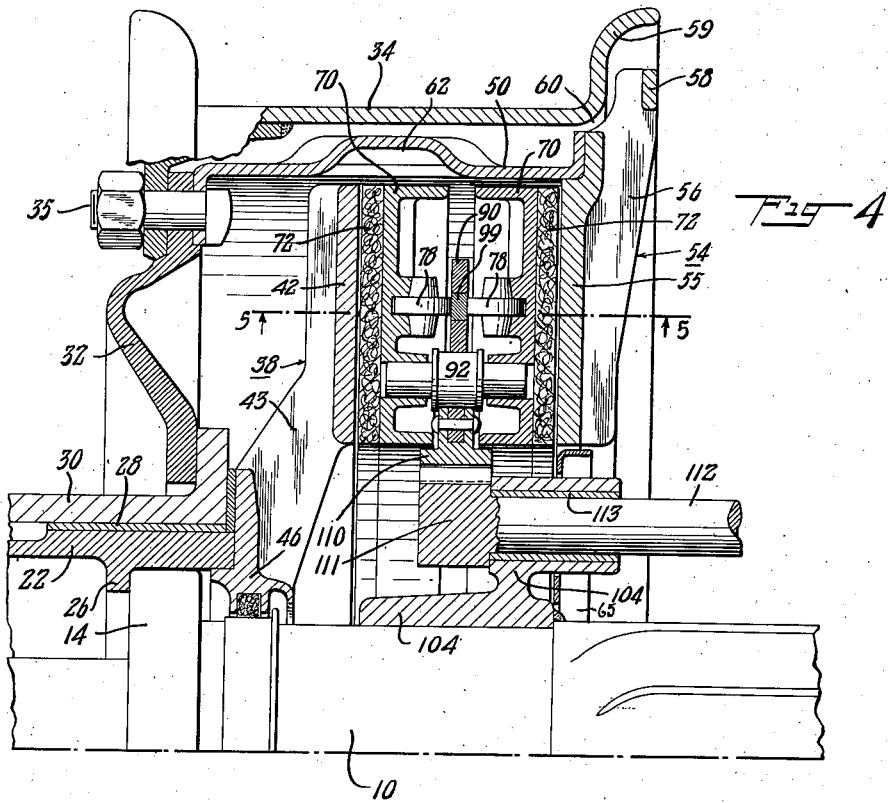
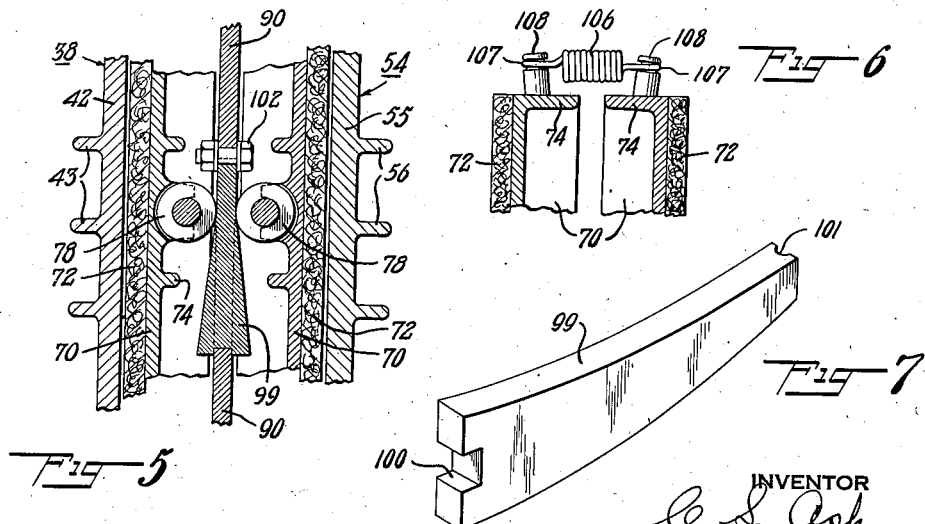

2,329,097

UNITED STATES PATENT OFFICE 2,329,097

DUAL WHEEL BRAKE

Charles S. Ash, Milford, Mich.

Application October 24, 1940, Serial No. 362,496

5 Claims. (Cl. 188—18)

The present invention relates to new and useful improvements in brakes and more particularly to an improved braking mechanism particularly useful in connection with independently rotatable dual wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a vertical sectional view of a typical and illustrative braking mechanism according to the present invention as embodied for use with a pair of undriven independently rotatable dual wheels;

Figure 2 of the drawings is a sectional view taken on the line 2—2 of Figure 1;

Figure 3 is a side elevation, with certain parts shown in section as taken on the line 3—3 of Figure 1, of the structure shown in Figure 1;

Figure 4 is a fragmentary detailed sectional view taken on the line 4—4 of Figure 3;

Figure 5 is a fragmentary sectional view taken on the line 5—5 of Figure 4;

Figure 6 is a fragmentary detailed sectional view taken on the line 6—6 of Figure 2; and Figure 7 is a detailed perspective view of one of the brake expanding elements used in the illustrated embodiment.

The present invention has for its object the provision of a novel and improved braking mechanism which has a relatively large braking area, is compact, of simple construction, is easily maintained in adjustment and may be economically manufactured. A further object of the invention is the provision of a novel and improved disc brake for automotive vehicles. The invention also provides a disc brake which is of relatively strong construction and in which the disc-like braking members are not subject to excessive warping as they are heated by their braking action. Still another object of the invention is the provision of an improved braking structure which is especially suited to the equalized, independent braking of independently rotatable dual wheels.

As illustrated by the present preferred embodiment of the invention, the disc brake of the present invention comprises a pair of generally similar discs positioned between disc-like brake shoes attached to the wheel or dual wheels of the vehicle and engageable with the shoes by axial expansion of the braking discs. The expansion means between the braking discs preferably comprises another disc-like member relatively rotatable with respect to the wheels and the braking members, and is mounted for rotation by means of anti-friction rollers, and other anti-friction rollers are provided between the expansion means and the braking discs. The expansion means is preferably formed with arcuate slots in which are held arcuate wedge members which may be easily replaced either to change the brake leverage ratio or for the replacement of worn parts. The brake actuating means may be connected with the rotatable expansion member by means of gear teeth formed on the inner surface of the disc and pinion teeth on the actuating member meshing therewith.

In order to prevent excessive warping of the brake discs, these members are preferably provided on their non-operating sides with circular ribs which strengthen them, and there are preferably provided a relatively large number of the expanding wedge members so as to provide contact between the expansion means and the brake discs at the correspondingly large number of points, thereby facilitating the even distribution of braking pressure over the discs. As a further aid in preventing warping of the brake discs, cooling means are provided for circulating a relatively great quantity of air over the brake discs and shoes, and this quantity of air is augmented by the centrifugal fan action of the brake shoes.

It will be understood that the foregoing general description and the following detailed description as well, are exemplary and explanatory of the invention but are not restrictive thereof.

Referring now in detail to the accompanying drawings showing an illustrative embodiment of the invention as applied to non-driven independently rotatable dual wheels, there is provided an axle 10 on which are mounted the anti-friction bearings 12 and 14 retained in proper position by means of the washer 16 and castellated nut 17. The outer wheel 20 is secured to the smaller cylindrical hub 22 by means of the cap screws 24, and the hub 22 is mounted for rotation about the axle 10 by means of the bearings 12 and 14, and is held in proper axial relation with respect to the bearings by means of the shoulders 25 and 26. Journalled on the hub 22 by means of bushing 28 is another hub 30 to which is fastened the inner wheel 32 secured thereto by means of stud 33, and a lubricant pocket 31 in the inner hub 22 serves to retain lubricant for the relative rotation of these hubs and their wheels.

Any suitable form of tires and rims may be mounted on the outer peripheries of wheel 20 and 32, an inner wheel tire mounting rim 34 being shown in Figure 4, where it is attached to the wheel member 32 by means of the mounting bolts 35.

Hubs 22 and 30 and their respective wheels are held against axial displacement, and the relative thrust of these two hubs is taken up by means of the thrust washer 36 positioned between the inner radial face of hub 30 and the outer radial face of brake shoe 38 which is attached to the inner end of hub 22 by means of the screws 40, while at the other end of hub 30 the axial thrust is taken by means of the finished radial end of hub 30 bearing against the finished radial surface on the inside of wheel 20.

Inidvidual braking means are provided for the inner and outer wheels, and the outer wheel brake comprises the brake shoe 38 having a disclike friction member 42 connected by means of the radial webs or vanes 43 with a central ring 46 which is shouldered, as at 47, to fit within the cylindrical bore of hub 22, thereby accurately locating the braking surface 42 when the shoe 38 is secured in place by means of the screws 40. Vanes 43 not only rigidly connect the member 42 to the ring 46 but also serve to dissipate heat from the friction surface 42 and at the same time impel the air to produce a powerful centrifugal fan action increasing the circulation of air over the braking member 38 to keep it cool.

The inner wheel 32 is provided with an inwardly extending generally cylindrical member 50 which may be formed of drawn sheet metal, and is secured to the inner face of the inner wheel by means of bolts 52, and at its innermost side is flanged for the accurate mounting of brake shoe 54, having a braking face 55 which is of a similar size and shape to face 42, faces 42 and 55 being positioned towards each other and a convenient distance apart.

Brake shoe 54 is provided with radially extending strengthening ribs 56 which terminate in a ring 58 of somewhat smaller diameter than the flange 59 of rim 34, providing a passageway 60 through which the cooling air may issue after it has been forced through the louvres 62 formed in the otherwise cylindrical exterior of drum 50, the circulation of air being increased by the centrifugal fan action of the vanes 43 on the outer wheel brake shoe 38. Air is admitted into the braking mechanisms through the louvres 64, which will be more fully described below. Ribs 56 provide a similar forced circulation of air over the brake shoe 54 to guard against its excessive heating.

Positioned between the brake faces 42 and 55 are a pair of annular or disc-like expansible braking members 70 which may be duplicates of each other, and on their distant radial faces, adjacent the faces 42 and 55 of brake shoes 38 and 54, are provided with flat molded discs or rings of brake lining or other friction material 72.

On their adjacent faces each of the brake members 70 is formed with integral strengthening ribs 74 which form a network over one face of the member, and are so distributed as to make all parts of the member relatively inflexible. The circularly extending ribs 74 join, at a plurality of equally spaced points circumferentially of the member, as at 77, and these junctures are recessed to receive the anti-friction rollers 78 which are arranged in a circle concentric with the member 70. The friction material 72 is secured to the member 70 by means of the usual rivets 79 and provides a flat braking surface to contact the brake shoes 42 and 55.

Means are provided for powerfully and gradually expanding the brake discs 70 away from each other and into uniform contact with the brake shoes 42 and 55 for the two wheels. As embodied, a disc 90 is positioned between the discs 70 and is mounted for limited rotary movement relatively to the discs 70 by means of the arcuate slots 91 and the flanged roller 92 journalled in the brake discs 70 and by the arcuate slots 93 and 94 supported by lugs 95 and guiding springs 96. At one end, slot 91 is enlarged to allow removal and insertion of roller 92.

Disc 90 is also formed with a series of arcuate slots 98 which are adapted to receive the arcuate wedge members 99 which cooperate with rollers 78 on each side and are all faced in one direction so that relative movement of discs 70 and 90 cause axial movement of the discs 70.

Each of the wedges 99 is slotted at its ends, the slot 100 at one end being at right angles to the arcuate slot 101 at the other end. The arcuate slot 101 cooperates with a short bolt 102 to hold the wedges assembled in the disc 90 and at the same time permit their easy replacement.

Brake discs 70 have only axial movement and are slotted to fit over the ends of three armed spider supports 104 secured to the axle or axle tube 10 and spider 104 may also carry the lugs 95. Disc 90 is also held coaxial with the brake discs 70 by means of the guide members 75 which extend axially of the discs, are integral with one of the discs 70, and are relatively closely fitted to the circular peripheral edge of the disc 90, thereby allowing disc 90 to have substantially only rotary movement.

Brake discs 70 are normally retracted by means of the springs 106 which have their ends 107 looped over pins 108 which project inwardly from the discs 70.

Brake actuating means for rotating the disc 90 and wedges 98 to expand the discs 70 comprise the gear segment 110 riveted to the inner edge of the disc 90 and cooperating with a pinion 111 at the inner end of shaft 112 journalled in bushing 113 supported by spider 104, so that as shaft 112 is rotated by power or manually in a counter-clockwise direction (Fig. 2) the brake is applied, and the radial thrust of the teeth of pinion 111 on the segment 110 is resisted by roller 92 which permits easy turning of the disc 90. The usual power operating means or brake cable may be connected to arm 114 fast on the end of shaft 112.

In the operation of the illustrative embodiment wheels 20 and 32 are free to rotate relatively to each other and at all times the brake shoe discs 38 and 54 rotate with wheels 20 and 32 respectively. Normally brake shoe discs 38 and 54 are out of contact with the brake discs 70 so that this rotation of the wheels is unretarded. The rotation of the brake shoe disc 38 causes air to be drawn through louvres 64, across spider 104, and it is expelled outwardly past the periphery of the brake shoe disc 42 and through louvres 62 so that it may issue through the passageways 60.

Louvres 64 are stamped up in a plate 55 fast to spider 104 by means of the screws 66, this plate also serving to exclude pebbles and other foreign matter from the brake mechanism, while permitting passage of air into the brake mechanism.

As shaft 112 is rotated, disc 90 and its supported wedges 98 are rotated, rolling on rollers 92 and 78 and expand the discs 70 into powerful braking contact with the brake surfaces 42 and 55. As the brake discs 70 are held against rotation and their rollers 78 contact at many uniformly spaced points around their circumference, the retarding action on the wheels is uniform over the whole surface of the discs producing even wear of the brake linings and tending to reduce the tendency of the various members to warp.

As the shaft 112 is reversely moved to release the brakes, wedges 98 are withdrawn from between the discs 70 and springs 106 retract the discs 70 away from the discs 42 and 55 while they are held in proper alinement by the ends of spider 104, the pins 95 and roller 92.

The invention in its broader aspects is not limited to the specific mechanisms shown and described but departures may be made therefrom within the scope of the accompanying claims without departing from the principles of the invention and without sacrificing its chief advantages.

What I claim is:

1. In a brake for automotive vehicles, the combination of a pair of disc-like brake shoes, an intermediate relatively rotatable member having arcuate inclined surfaces to move the shoes axially by rotation of said member, gear teeth on said member, a pinion cooperating therewith to rotate the member, said member also being formed with an arcuate slot adjacent said teeth and pinion and a roller in said slot and journalled in said shoes to support the member and resist the radial thrust of the pinion.

2. In a brake for automotive vehicles, the combination of a pair of disc-like brake shoes, an intermediate relatively rotatable member having arcuate inclined surfaces to move the shoes axially by rotation of said member, said member being formed with an arcuate slot, a roller in said slot and rotatably supported by the brake shoes, a rotatable shaft and means interconnecting the shaft and member near the slot and roller for rotating the member by rotation of the shaft.

3. A brake actuating member comprising a rotatable member having arcuate slots therein, and wedges secured in said slots, each wedge being slotted at one end to fit over an end of the arcuate slot and a bolt at the other end to secure the wedge in the member.

4. In a brake for automotive vehicles, the combination of a pair of disc-like brake shoes, an intermediate relatively rotatable member having inclined surfaces to move the shoes axially by rotation of said member, gear teeth on said member, a pinion cooperating therewith to rotate the member, said member also being formed with an arcuate slot adjacent said teeth and pinion and a roller in said slot to support the member and resist the radial thrust of the pinion.

5. In a brake for automotive vehicles, the combination of a pair of disc-like brake shoes, an intermediate relatively rotatable member having inclined surfaces to move the shoes axially by rotation of said member, said member being formed with an arcuate slot, a roller in said slot and rotatably supported by the brake shoes, and means for rotating the member.

CHARLES S. ASH.